US012608424B2

(12) United States Patent
Afrasiabi

(10) Patent No.: US 12,608,424 B2
(45) Date of Patent: Apr. 21, 2026

(54) METHOD AND APPARATUS FOR EFFICIENTLY EXTRACTING AND REPRESENTING INFORMATION FROM TECHNICAL DIAGRAMS

(71) Applicant: The Boeing Company, Chicago, IL (US)

(72) Inventor: Amir Afrasiabi, University Place, WA (US)

(73) Assignee: The Boeing Company, Arlington, VA (US)

( * ) Notice: Subject to any disclaimer, the term of this patent is extended or adjusted under 35 U.S.C. 154(b) by 725 days.

(21) Appl. No.: 17/463,916

(22) Filed: Sep. 1, 2021

(65) Prior Publication Data

US 2023/0067997 A1 Mar. 2, 2023

(51) Int. Cl.
| | |
|---|---|
| *G06F 16/903* | (2019.01) |
| *G06F 16/28* | (2019.01) |
| *G06F 16/901* | (2019.01) |
| *G06N 3/042* | (2023.01) |
| *G06N 3/08* | (2023.01) |

(52) U.S. Cl.
CPC ...... *G06F 16/90335* (2019.01); *G06F 16/288* (2019.01); *G06F 16/9024* (2019.01); *G06N 3/042* (2023.01); *G06N 3/08* (2013.01)

(58) Field of Classification Search
None
See application file for complete search history.

(56) References Cited

U.S. PATENT DOCUMENTS

| | | | | |
|---|---|---|---|---|
| 10,719,549 | B2 * | 7/2020 | Lieutier | G06F 16/51 |
| 2006/0082595 | A1 * | 4/2006 | Liu | G06V 30/422 |
| | | | | 345/629 |
| 2017/0169290 | A1 * | 6/2017 | Held | G06F 18/22 |
| 2017/0169291 | A1 * | 6/2017 | Held | G06V 30/422 |
| 2021/0081717 | A1 * | 3/2021 | Creed | G06N 5/022 |
| 2021/0295036 | A1 * | 9/2021 | Agarwal | G06F 40/56 |
| 2022/0092427 | A1 * | 3/2022 | Müller | G06N 3/08 |

(Continued)

OTHER PUBLICATIONS

Elyan, Eyad, Laura Jamieson, and Adamu Ali-Gombe. "Deep learning for symbols detection and classification in engineering drawings." Neural networks 129 (2020): 91-102. (Year: 2020).*

(Continued)

*Primary Examiner* — Richard L Bowen
(74) *Attorney, Agent, or Firm* — Harrity & Harrity, LLP

(57) ABSTRACT

A computer-implemented method for extracting information from a diagram comprises identifying, via first machine learning logic implemented by a computer, features associated with an article illustrated in the diagram. A knowledge graph that defines relationships between the features is generated via second machine learning logic implemented by the computer and based on the features. The knowledge graph specifies nodes associated with the features and edges between the nodes that specify the relationships between the features. A request for information associated with the diagram is received by the computer and from a user. The computer searches the knowledge graph for the information associated with the request and communicates the information associated with the request to the user.

20 Claims, 8 Drawing Sheets

(56) References Cited

U.S. PATENT DOCUMENTS

2022/0171891 A1\* 6/2022 Sinha ..................... G06N 5/022

OTHER PUBLICATIONS

Steinegger et al. "Automated code generation for programmable logic controllers based on knowledge acquisition from engineering artifacts: Concept and case study." Proceedings of 2012 IEEE 17th Int. Conf. on Emerging Technologies & Factory Automation (ETFA 2012). IEEE, pp. 1-8 (Year: 2012).\*
Rahul, Rohit, et al. "Automatic information extraction from piping and instrumentation diagrams." arXiv preprint arXiv:1901.11383 (2019). 10 pages. (Year: 2019).\*

\* cited by examiner

300

305

SELECT NEXT TRAINING DIAGRAM

310

CONVERT FEATURES ASSOCIATED WITH ARTICLE IN TRAINING DIAGRAM INTO METADATA

315

GENERATE KNOWLEDGE GRAPHS THAT SPECIFY DIFFERENT TYPES OF RELATIONSHIPS BETWEEN THE FEATURES BASED ON METADATA

320

TRAIN GRAPH NEURAL NETWORK WITH THE KNOWLEDGE GRAPHS

325

MORE TRAINING DIAGRAMS?

END TRAINING

400

405
SELECT NEXT DIAGRAM

410
CONVERT FEATURES ASSOCIATED WITH ARTICLE IN DIAGRAM INTO METADATA

415
PROCESS METADATA WITH TRAINED GRAPH NEURAL NETWORK

420
STORE KNOWLEDGE GRAPH TO DATABASE

425
MORE DIAGRAMS?

YES

NO

FINISHED

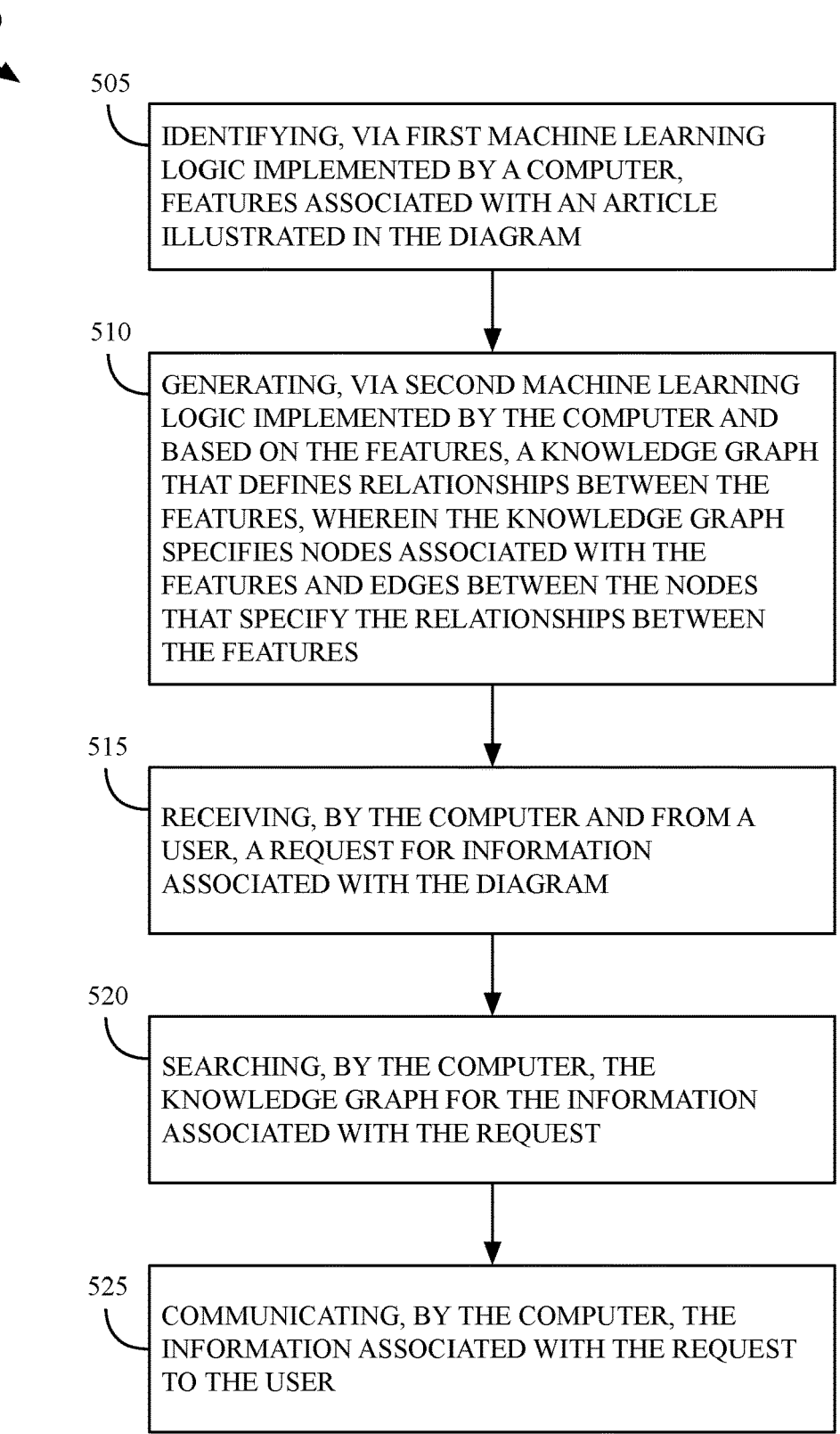

500

505

IDENTIFYING, VIA FIRST MACHINE LEARNING LOGIC IMPLEMENTED BY A COMPUTER, FEATURES ASSOCIATED WITH AN ARTICLE ILLUSTRATED IN THE DIAGRAM

510

GENERATING, VIA SECOND MACHINE LEARNING LOGIC IMPLEMENTED BY THE COMPUTER AND BASED ON THE FEATURES, A KNOWLEDGE GRAPH THAT DEFINES RELATIONSHIPS BETWEEN THE FEATURES, WHEREIN THE KNOWLEDGE GRAPH SPECIFIES NODES ASSOCIATED WITH THE FEATURES AND EDGES BETWEEN THE NODES THAT SPECIFY THE RELATIONSHIPS BETWEEN THE FEATURES

515

RECEIVING, BY THE COMPUTER AND FROM A USER, A REQUEST FOR INFORMATION ASSOCIATED WITH THE DIAGRAM

520

SEARCHING, BY THE COMPUTER, THE KNOWLEDGE GRAPH FOR THE INFORMATION ASSOCIATED WITH THE REQUEST

525

COMMUNICATING, BY THE COMPUTER, THE INFORMATION ASSOCIATED WITH THE REQUEST TO THE USER

*Fig. 5*

METHOD AND APPARATUS FOR EFFICIENTLY EXTRACTING AND REPRESENTING INFORMATION FROM TECHNICAL DIAGRAMS

BACKGROUND

Field

This application generally relates to information processing systems. In particular, this application describes a method and apparatus for efficiently extracting and representing information from technical diagrams.

Description of Related Art

Some technical diagrams, such as general arrangement drawings (GADs), are used to represent the overall composition of an article. Depending on the complexity of the article, the diagram may include a number of different projections or views of the article, such as a front view, a top view, a side view, etc. These diagrams may also specify various physical dimensions. For example, a technical diagram for an aircraft may specify the length of the fuselage, the distance between engines on a wing, etc. Some technical diagrams also include a characteristic data table that specifies various aspects associated with the article. Following the example above, the characteristic data table for a technical diagram for an aircraft may specify the maximum speed, load capacity, etc., associated with the aircraft.

A significant number of technical diagrams are represented only in print form or as a scanned version thereof. This is the case for many manufacturing organizations that were in operation before the advent of computer-aided design (CAD) software. For example, an aircraft manufacture in operation before the advent of CAD software may have hundreds of thousands of technical diagrams related to various aircraft designs, aircraft components, etc. These technical documents can contain a wealth of information that could be useful to present-day designers. Unfortunately, the information contained in these technical diagrams is not generally available in a searchable form, making it difficult to find technical diagrams that might otherwise assist in the design of a new article.

SUMMARY

In a first aspect, a computer-implemented method for extracting information from a diagram comprises identifying, via first machine learning logic implemented by a computer, features associated with an article illustrated in the diagram. A knowledge graph that defines relationships between the features is generated via second machine learning logic implemented by the computer and based on the features. The knowledge graph specifies nodes associated with the features and edges between the nodes that specify the relationships between the features. A request for information associated with the diagram is received by the computer and from a user. The computer searches the knowledge graph for the information associated with the request and communicates the information associated with the request to the user.

In a second aspect, a computing system includes a memory and a processor. The memory stores instruction code. The processor is in communication with the memory. The instruction code is executable by the processor to cause the computing system to perform operations that comprise identifying, via first machine learning logic implemented by a computer, features associated with an article illustrated in the diagram. A knowledge graph that defines relationships between the features is generated via second machine learning logic implemented by the computer and based on the features. The knowledge graph specifies nodes associated with the features and edges between the nodes that specify the relationships between the features. A request for information associated with the diagram is received by the computer and from a user. The computer searches the knowledge graph for the information associated with the request and communicates the information associated with the request to the user.

In a third aspect, a non-transitory computer-readable medium having stored thereon instruction code is provided. When the instruction code is executed by a processor, the processor performs operations that comprise identifying, via first machine learning logic implemented by a computer, features associated with an article illustrated in the diagram. A knowledge graph that defines relationships between the features is generated via second machine learning logic implemented by the computer and based on the features. The knowledge graph specifies nodes associated with the features and edges between the nodes that specify the relationships between the features. A request for information associated with the diagram is received by the computer and from a user. The computer searches the knowledge graph for the information associated with the request and communicates the information associated with the request to the user.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

FIG. 5 illustrates operations performed by one or more systems or devices described herein.

DETAILED DESCRIPTION

Figure 1:
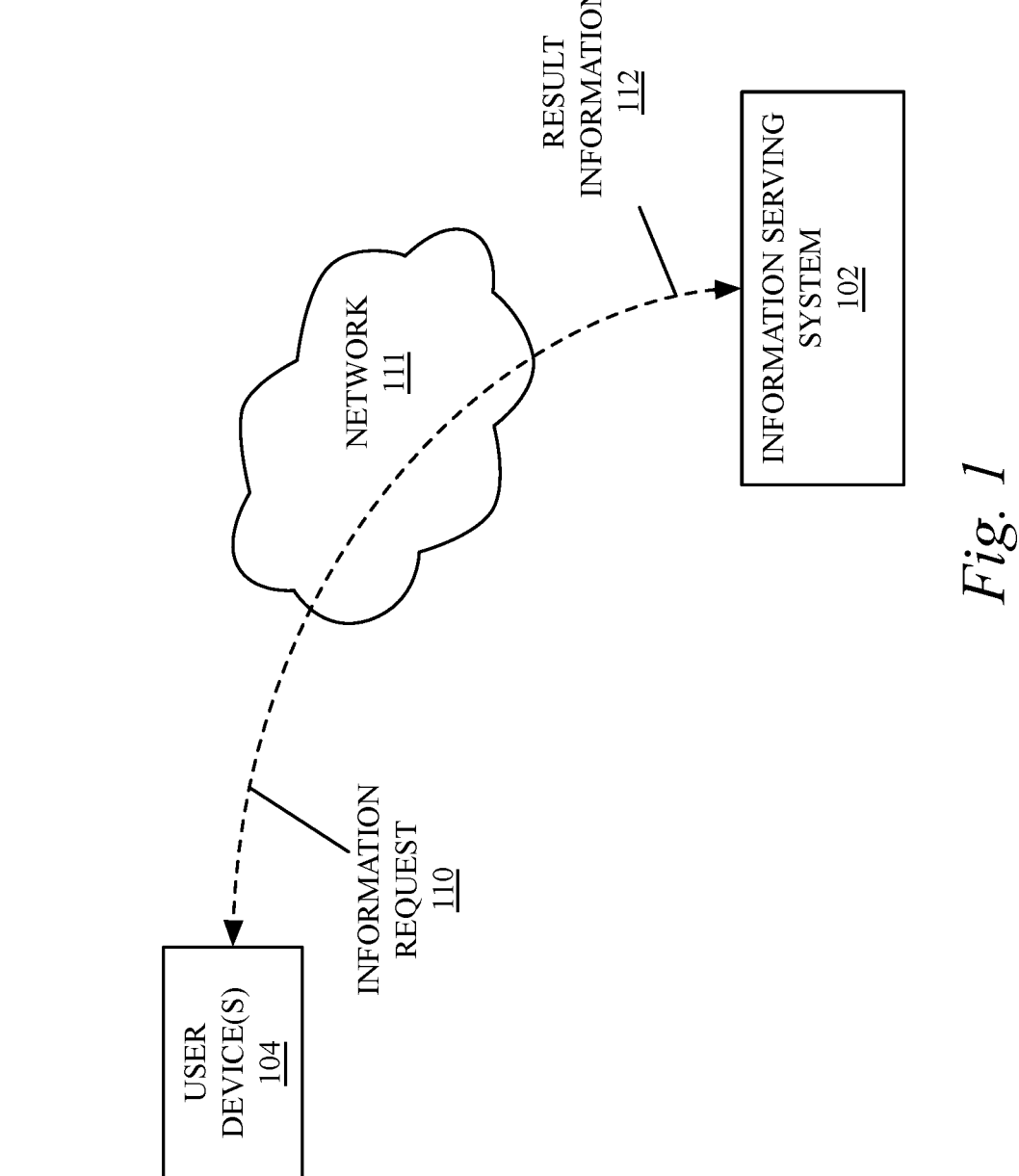
FIG. 1 illustrates an environment that includes various systems/devices that facilitate extracting information from technical diagrams, in accordance with example embodiments.

Implementations of this disclosure provide technological improvements that are particular to computer technology, such as those related to reducing the time and memory required to process a search request. In this regard, a computing system disclosed herein utilizes machine learning logic to gather information from diagrams and represents the information from each diagram in a knowledge graph. The computing system receives a search query for diagrams that specify particular information and searches for knowledge graphs that match the request. A listing of diagrams associated with matching knowledge graphs is communicated to a requestor.

The knowledge graph combines information that would otherwise be stored in disparate silos of data and facilitates high-quality/relevant searching. This, in turn, reduces computer resource usage that would otherwise be consumed in the processing of various disparate search requests associated with disparate silos of data.

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially" or "about" that may be used herein are meant that the recited characteristic, parameter, or value need not be achieved exactly, but that deviations or variations, including, for example, tolerances, measurement error, measurement accuracy limitations and other factors known to those skilled in the art, may occur in amounts that do not preclude the effect the characteristic was intended to provide.

As noted above, a significant number of technical diagrams are represented only in print form or as a scanned version thereof. These technical documents can contain a wealth of information that could be useful to present-day designers. In some cases, optical character recognition may be used to identify text on these diagrams, but text information alone may not be particularly useful to a designer. Rather, of more interest to the designer may be technical diagrams that depict an article having certain features. For instance, an aircraft designer may be interested in reviewing technical diagrams that show aircraft having two engines on a wing and that are capable of carrying a particular load. Determining this information would ordinarily require subject matter review of the diagram. Such a review, however, is not practical when there are thousands of technical diagrams to review.

Examples of systems and methods that ameliorate the aspects described above are described herein. Some examples of methods involve using machine learning logic to identify features associated with an article illustrated in a diagram. Some examples of the machine learning logic are trained to identify views illustrated in a technical diagram, an article illustrated in the views, and components of the article. Some examples of the machine learning logic are further trained to identify geometric dimensioning and tolerancing (GD&T) information features illustrated in the views, such as dimension lines that connect to the article and that specify various physical dimensions (e.g., length, width, radius, etc.) associated with the article or the components of the article.

After identifying the features above, the machine learning logic is configured to generate a knowledge graph that defines relationships between the features. The knowledge graph specifies nodes associated with the features and edges between the nodes that specify the relationships between the features. The knowledge graph is searchable and facilitates determining information related to the technical diagram. For instance, in an example, a computer receives a request for information and searches the knowledge graph to determine the requested information. Following the example above, the request may be "Retrieve all technical diagrams of an aircraft, where the aircraft has two engines on each wing, where the aircraft has a maximum load capacity of 20,000 lbs." Examples of the computer search knowledge graphs associated with a multitude of technical diagrams to identify technical diagrams that illustrate aircraft having the requested features. A listing of the identifying technical diagrams can be communicated to the requestor.

FIG. 1 illustrates an example of an environment 100 that includes various systems/devices that facilitate extracting information from technical diagrams. Example systems/devices of the environment 100 include user device 104 and an information serving system (ISS) 102. As described in further detail below, the user device 104 is configured to communicate an information request 110 to the ISS 102. Some examples of the information request 110 correspond to queries. For instance, an example of the query in the aircraft context may be "Retrieve all technical diagrams of an aircraft, where the aircraft has two engines on each wing, where the aircraft has a maximum load capacity of 20,000 lbs." Some examples of the query are specified via a web browser hosted by the IIS 102 and are specified in plain English or a different language.

In response to receiving the information request 110, the ISS 102 is configured to identify technical diagrams related to the information request 110 and to communicate result information 112 that specifies identified technical diagrams. In some examples, the result information 112 specifies links (e.g., uniform resource locators) to digitized/scanned versions of the technical diagrams.

In an example, the user device 104 and the ISS 102 communicate information to one another via a communication network 111, such as the Internet, a cellular communication network, a WiFi network, etc.

Figure 2:
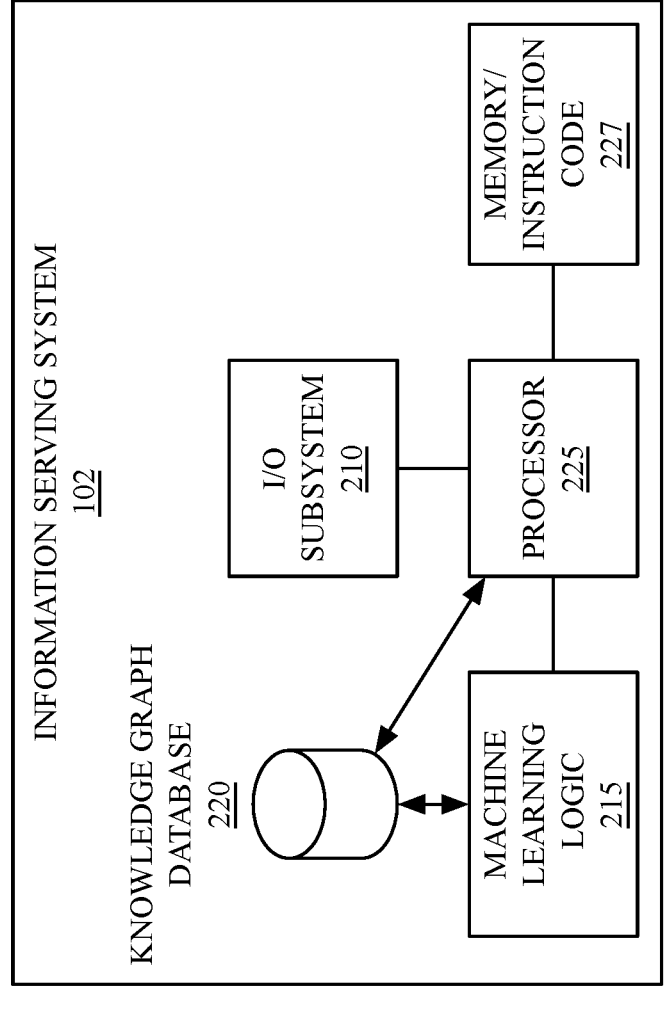
FIG. 2 illustrates an information serving system (ISS), in accordance with example embodiments.

FIG. 2 illustrates an example of an ISS 102. An example of the ISS 102 includes a memory 227 and a processor 225. An example of ISS 102 also includes an input/output (I/O) subsystem 210, machine learning (ML) logic 215, and a knowledge graph database 220.

An example of the processor 225 is in communication with the memory 227. The processor 225 is configured to execute instruction code stored in the memory 227. The instruction code facilitates performing, by the server 102, various operations that are described below. In this regard, the instruction code can cause the processor 225 to control and coordinate various activities performed by the different subsystems of the server 102. The processor 225 can correspond to a stand-alone computer system such as an Intel®, AMD®, or PowerPC® based computer system or a different computer system and can include application-specific computer systems. The computer system can include an operating system, such as Linux, Unix®, or a different operating system.

An example of the I/O subsystem 210 includes one or more input/output interfaces configured to facilitate communications with entities outside of the ISS 102. An example of the I/O subsystem 210 is configured to communicate information via a RESTful API or a Web Service API. An example of I/O subsystem 210 implements a web browser to facilitate generating one or more web-based interfaces through which users of the ISS 102, the user device 104, and/or other systems interact with the ISS 102.

An example of the I/O subsystem 210 includes communication circuitry configured to facilitate communicating information to and from the ISS 102. An example of the communication circuitry facilitates wired and/or wireless communication. For instance, an example of the communication circuitry facilitates communicating information via a wired and/or wireless Internet connection. An example of the communication circuitry facilitates communicating information via a cellular telephone network such as a 3G, 4G, and/or 5G network. Other examples of the communication circuitry facilitate communication of information via an 802.11 based network, Bluetooth®, Zigbee®, near field communication technology, or a different wired or wireless network.

An example of the ML logic 215 is configured to, alone or in combination with other subsystems of the ISS 102, generate knowledge graphs associated with technical diagrams. In some examples, the knowledge graphs are stored in the knowledge graph database 220, and the knowledge graph database 220 is configured to be searched to provide result information 112 associated with an information request 110. Some examples of the ML logic 215 include hardware, software, or a combination thereof that is specifically configured to implement or assist in the implementation of various supervised and unsupervised machine learning models. Within examples, these can involve implementation of one or more of a Holt-Winters algorithm, exponential time smoothing (ETS) algorithm, an artificial neural network (ANN), a recurrent neural network (RNN), convolutional neural network (CNN), a seasonal autoregressive moving average (SARIMA) algorithm, a network of long short-term memories (LSTM), a gated recurring unit (GRU) algorithm, a graph neural network (GNN), and/or a feed-forward neural networks (FFN), etc. Examples of the ML logic 215 can implement other machine learning (ML) logic and/or AI algorithms.

Figure 3A:
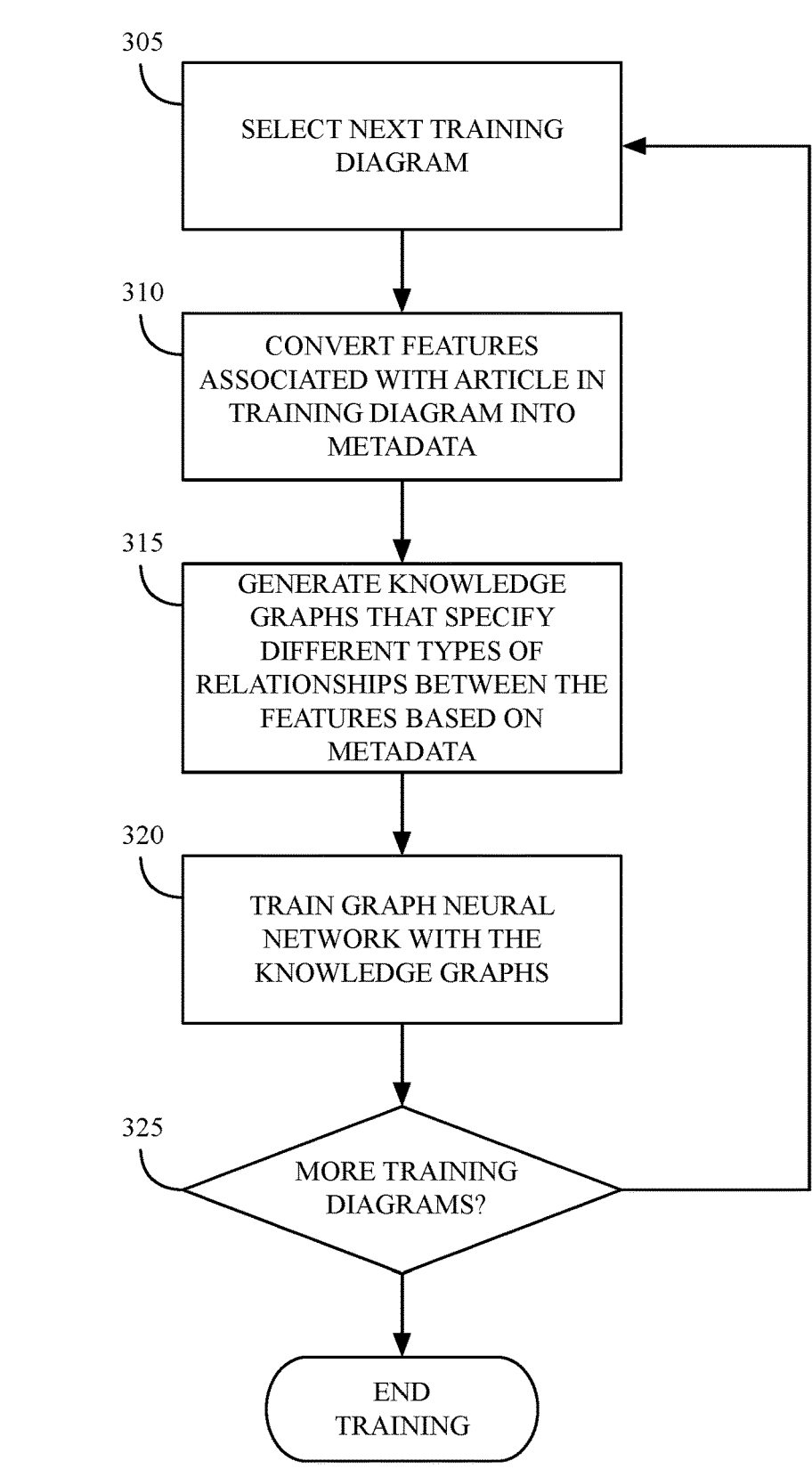
FIG. 3A illustrates operations performed by an ISS that facilitate training machine learning (ML) logic, in accordance with example embodiments.
Figure 3B:
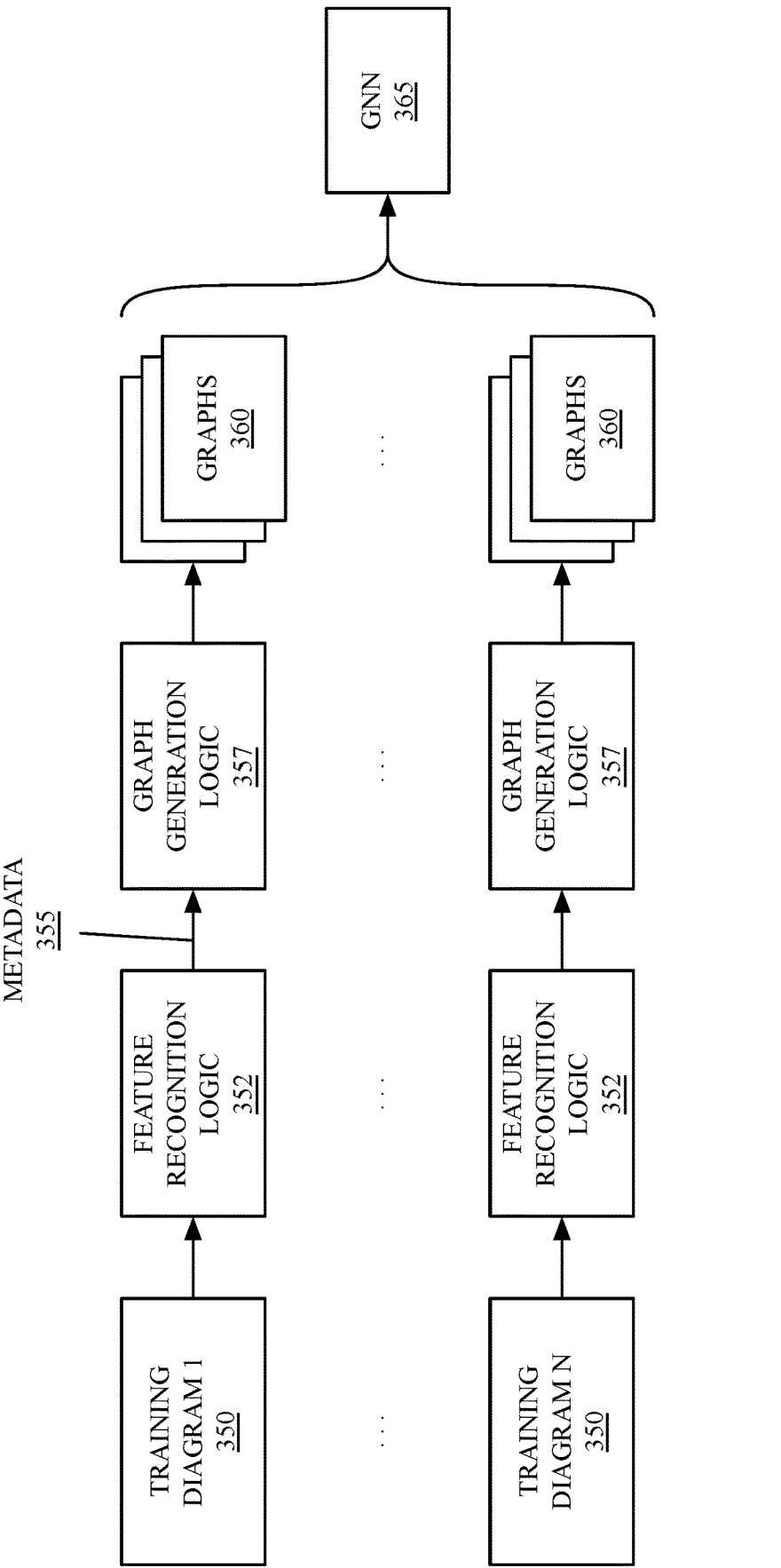
FIG. 3B logically represents aspects of the operations of FIG. 3A, in accordance with example embodiments.

FIG. 3A illustrates examples of operations 300 performed by some examples of the ISS 102 that facilitate training the ML logic 215. FIG. 3B logically represents aspects of the operations of FIG. 3A.

An example of the operation at block 305 involves selecting a training diagram 350. Some examples of the training diagram 350 correspond to general arrangement drawings that illustrate one or more views of an article. Some examples of the training diagram 350 further illustrate geometric dimensioning and tolerancing (GD&T) information, such as dimension lines that connect to the article and that specify various physical dimensions (e.g., length, width, radius, etc.) associated with the article or the components of the article.

Some examples of the operation at block 310 involve converting features associated with an article illustrated in the training diagram 350 into metadata 355. In this regard, some examples of the ML logic 215 of the ISS 102 comprise feature recognition logic 352 that is trained to identify features in the training diagram 350 and to represent these features as metadata 355.

Some examples of the feature recognition logic 352 comprise one or more convolutional neural networks (CNNs) that are trained to identify different types of features. For instance, an example of the feature recognition logic 352 includes a CNN trained to identify text information features, a CNN trained to identify geometric dimensioning and tolerancing (GD&T) information features, a CNN trained to identify one or more component features, and a CNN trained to identify view type features.

In some examples, the CNNs described above are trained by providing as input into the CNNs, labeled training diagrams 350. That is, training diagrams 350 in which features of interest are identified by a bounding box (e.g., a box that covers the extents of the feature) and a label (e.g., a particular name) that is associated with the bounding box.

Some examples of the text feature recognition CNN are trained with training diagrams 350 in which various textual elements are labeled. For instance, in some example training diagrams 350, a characteristic data table is labeled along with the textual information within the characteristic data table, such as objective function values. In some example training diagrams 350, dimension values associated with GD&T information are labeled. In some example training 350 diagrams, the title block is labeled.

Some examples of the GD&T feature recognition CNN are trained with training diagrams 350 in which various GD&T elements are labeled. For instance, in some example training diagrams 350, various horizontal dimension lines, vertical dimension lines, arrows that connect these lines, dimension symbols, etc., are labeled.

Some examples of the component feature recognition CNN are trained with training diagrams 350 in which various component elements are labeled. For instance, in some examples, training diagrams 350 associated with aircraft components such as the fuselage, wings, engines, landing gear, nose cone, tail, etc., are labeled.

An example of the view feature recognition CNN is trained with training diagrams 350 in which various view elements are labeled. For instance, in some example training diagrams 350 associated with an aircraft, a top view, side view, front view, etc., are labeled.

Some examples of the trained CNNs output an indication of the value or name of any features located in the training documents 350 along with a corresponding bounding box and centroid of the feature 352 specified, for example, in pixel coordinates. Some examples of the feature recognition logic 352 save this information as metadata 355.

Some examples of the operation at block 315 involve generating, by graph generation logic 357, one or more knowledge graphs 360 that specify different types of relationships between the features based on the metadata 355. In some examples, the graph generation logic 357 is implemented by a script (e.g., a python script) that is executed by the processor 225 of the ISS 102 and that causes the processor 225 to generate/convert the information in the metadata 355 into the knowledge graphs 360. Some examples of these knowledge graphs 360 specify nodes associated with the features and edges between the nodes that specify the relationships between the features. In this regard, some examples of these operations involve generating a first knowledge graph that specifies subcomponent relationships between features that correspond to components of the article. For instance, in the aircraft context, an example of this knowledge graph includes nodes for the aircraft fuselage, each wing, each landing gear, a nose cone, a tail, etc. A relationship in this knowledge specifies, for example, that the aircraft has a fuselage, that the fuselage has a nose cone. Another relation indicates that the aircraft has a wing, that the wing has an engine, that the wing has landing gear, etc.

Some examples of these operations involve generating a second knowledge graph that specifies connection relationships between the features that correspond to the components of the article and features associated with GD&T information. For instance, in the aircraft context, an example of this knowledge graph includes nodes for the aircraft fuselage, each wing, each landing gear, a nose cone, a tail, etc., and nodes for the horizontal lines, vertical lines, values, etc., associated with the GD&T information. A relationship in this knowledge specifies, for example, that the aircraft has a fuselage, that the fuselage is connected to a vertical line, that the vertical line is connected to a horizontal line, that the horizontal line is connected to a value, that the value is connected to a second horizontal line, that the second horizontal line is connected to a second vertical line, and that the second vertical line is connected to the fuselage. This set of nodes and relations describes, for example, GD&T information that specifies the length of the fuselage.

Some examples of these operations involve generating a third knowledge graph that specifies location relationships between the features that correspond to the components of the article and the features associated with GD&T information. Following the examples above, an example of this knowledge graph includes nodes for the various aircraft components and for the various features associated with the GD&T information. A relationship in this knowledge specifies, for example, that fuselage is below a vertical line, that the vertical line is to the left of a horizontal line, that the horizontal line is left of a value, that the value is left of a second horizontal line, that the second horizontal line is left of a second vertical line, and that the second vertical line is above the fuselage.

Some examples of the operation at block 320 involve training a graph neural network (GNN) 365 with the knowledge graphs 360 generated above. An example of the GNN specifies each node in each knowledge graph 360 as a recurrent neural network (RNN) and each relationship between each node in each knowledge graph 360 as a feed-forward neural network (FFN). A relationship between node A and node B is specified by connecting the outputs of the RNN associated with node A to the inputs of a FFN and the outputs of the FFN to the inputs of the RNN associated with node B. Each node is assigned an embedding (e.g., a hash of various attributes of the node). The embeddings are forwarded from one node (RNN) to the other via the FFN a number of times, and in so doing, each node becomes associated with a new embedding. The degree of relatedness between nodes can, in an example, be determined based on the Euclidean distance between their respective embeddings. Thus, the relatedness between features that are associated with these nodes can be inferred.

In some examples, if at block 325 there are additional training diagrams 350, then the operations are repeated from the operations at block 305. For instance, in an example, five hundred training diagrams 350 can be processed according to these operations to train the GNN 365. In some examples, after training the GNN 365, a confidence indication is generated as to the predictions made by the GNN 365 regarding the relationships between the nodes. The confidence indications are expressed as a confusion matrix that gives an indication of whether additional training diagrams 350 showing particular features will be required to improve the confidence of the predictions made by the GNN 365.

Figure 4A:
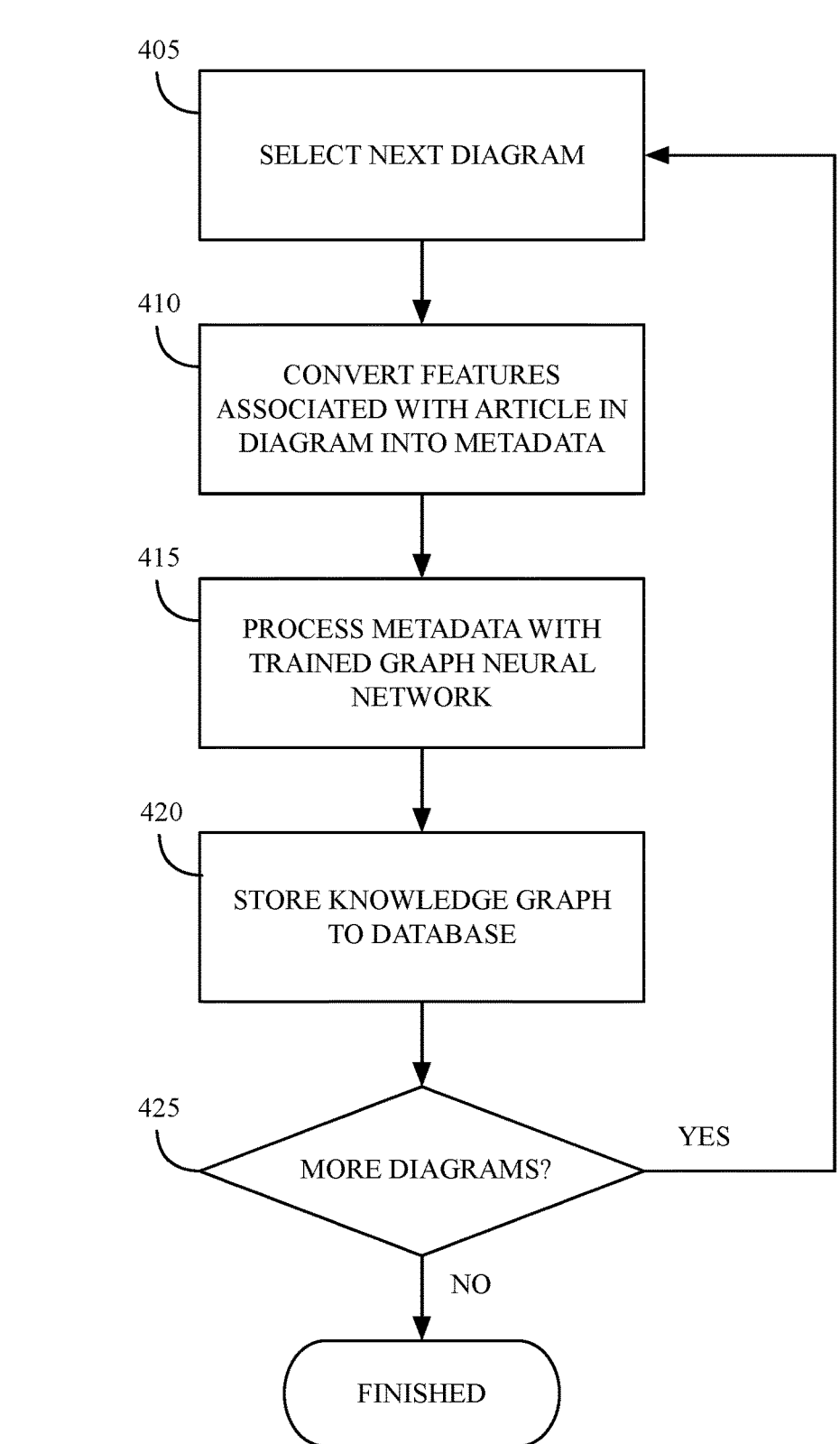
FIG. 4A illustrates operations performed by the ISS that facilitate generating knowledge graphs associated with diagrams, in accordance with example embodiments.
Figure 4B:
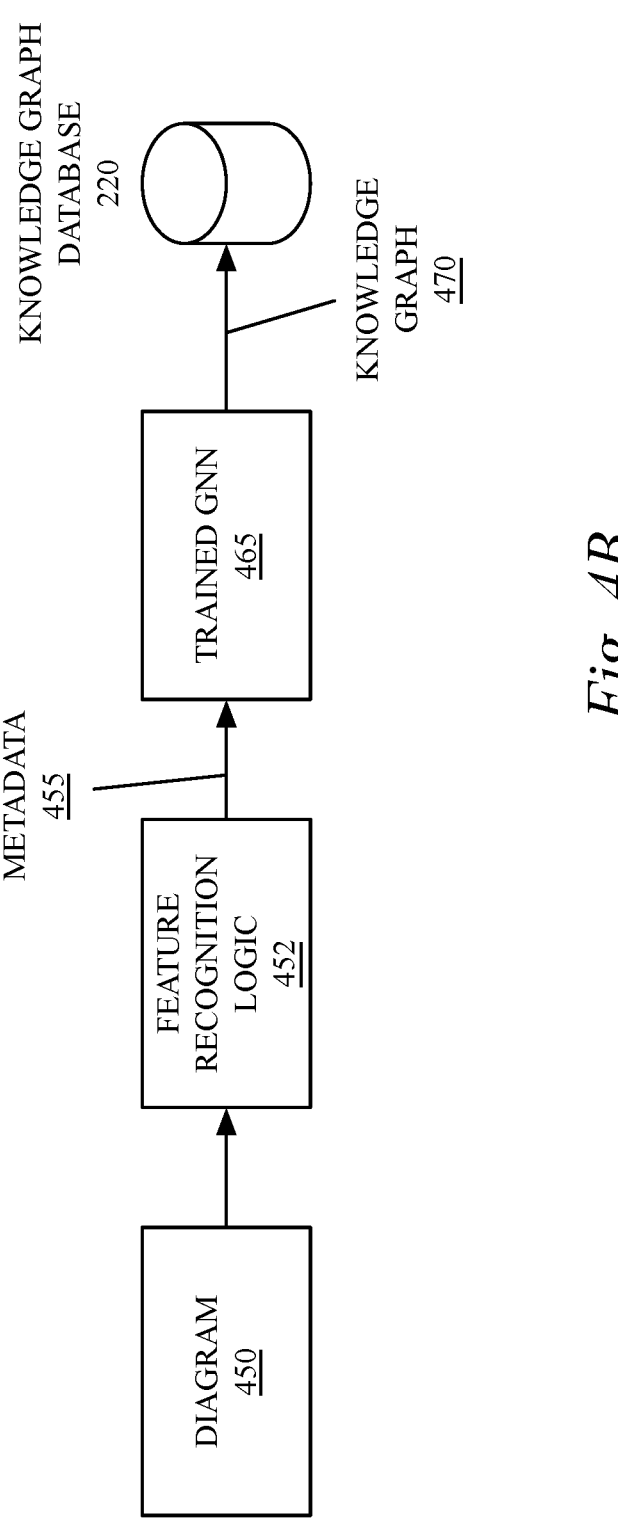
FIG. 4B logically represents aspects of the operations of FIG. 4A, in accordance with example embodiments.

FIG. 4A illustrates examples of operations 400 performed by some examples of the ISS 102 that facilitate generating knowledge graphs 470 associated with diagrams 450. FIG. 4B logically represents aspects of the operations of FIG. 4A.

An example of the operation at block 405 involves selecting a diagram 450. Some examples of the diagram 450 correspond to general arrangement drawings that illustrate one or more views of an article. Some examples of the diagrams 450 correspond to scanned versions of printed diagrams and are provided in a high-resolution digital imaging format. Some examples of the diagram 450 illustrate geometric dimensioning and tolerancing (GD&T) information, such as dimension lines that connect to the article and that specify various physical dimensions (e.g., length, width, radius, etc.) associated with the article or the components of the article.

Some examples of the operation at block 410 involve converting features associated with an article illustrated in the diagram 450 into metadata 455 using feature recognition logic 452. An example of the feature recognition logic 452 corresponds to the feature recognition logic 352 described above. Some examples of the feature recognition logic 452 output an indication of the value or name of any features located in the diagram 450 along with a corresponding bounding box and centroid of the feature 452 specified, for example, in pixel coordinates. Some examples of the feature recognition logic 452 save this information as metadata 455.

Some examples of the operation at block 415 involve processing the metadata 455 via a trained GNN 465 that, in some examples, is trained as described above. Some examples of the trained GNN 465 generate a knowledge graph 470 that specifies nodes that correspond to the features specified in the metadata 455 and edges between the nodes that indicate the different types of relationships between the features.

Some examples of the operation at block 420 involve storing the knowledge graph 470 generated above to the knowledge graph database 220.

In some examples, if at block 425 there are additional diagrams 450, then the operations are repeated from the operations at block 405. For instance, in an example, tens of thousands of diagrams 450 can be processed according to these operations, and corresponding knowledge graphs 470 associated with these diagrams 450 can be saved to the knowledge graph database 220. The knowledge graph database 220 can then be searched to identify diagrams 450 associated with a query such as "Retrieve all technical diagrams of an aircraft, where the aircraft has two engines on each wing, where the aircraft has a maximum load capacity of 20,000 lbs."

FIG. 5 illustrates examples of operations 500 performed by one or more systems or devices described herein. Examples of the operations at block 505 involve identifying, via first machine learning logic implemented by a computer, features associated with an article illustrated in the diagram.

Examples of the operations at block 510 involve generating, via second machine learning logic implemented by the computer and based on the features, a knowledge graph that defines relationships between the features. The knowledge graph specifies nodes associated with the features and edges between the nodes that specify the relationships between the features Examples of the operations at block 515 involve receiving, by a computer and from a user, a request for information associated with the diagram.

Examples of the operations at block 520 involve searching, by the computer, the knowledge graph for the information associated with the request.

Examples of the operations at block 520 involve communicating, by the computer, the information associated with the request to the user.

In some examples, identifying the features associated with the article illustrated in the diagram involves identifying, via the first machine learning logic, features associated with an article illustrated in a general arrangement drawing, wherein the general arrangement drawing specifies one or more views of the article and one or more physical dimensions associated with the article.

In some examples, identifying the features associated with the article illustrated in the diagram involves identifying, via one or more convolutional neural networks (CNNs), features associated with the article illustrated in the diagram, wherein the one or more CNNs include: a CNN trained to identify text information features, a CNN trained to identify geometric dimensioning and tolerancing (GD&T) information features, a CNN trained to identify one or more component features, and a CNN trained to identify view type features.

Some examples involve identifying, by the CNN trained to identify text information features, one or more data table features in a general arrangement drawing (e.g., values identified in tables and objection functions identified in the tables).

Some examples involve identifying, by the CNN trained to identify text information features, a characteristic data table feature in a general arrangement drawing, and specifying one or more objective function values of the characteristic data table as attributes of the characteristic data table feature.

In some examples, identifying features associated with the article illustrated in the diagram involves determining a feature type, a centroid of the feature, and a bounding box of the feature.

In some examples, generating the knowledge graph that defines the relationships between the features involves predicting, via a graph neural network and based on the features, the relationships between the features defined within the knowledge graph.

In some examples, the graph neural network is trained to predict the relationships between the features defined within the knowledge graph. In these examples, training of the graph neural network involves identifying, via the first machine learning logic, features associated with an article illustrated in a training diagram. Information associated with the features is converted into metadata. A plurality of knowledge graphs is generated by the computer, based on the metadata. Each knowledge graph specifies a different type of relationship between the features. The graph neural network is trained based on the plurality of knowledge graphs to determine the relationships between the features.

In some examples, generating the plurality of knowledge graphs involves generating a first knowledge graph that specifies subcomponent relationships between features that correspond to components of the article, generating a second knowledge graph that specifies connection relationships between the features that correspond to the components of the article and features associated with GD&T information, and generating a third knowledge graph that specifies location relationships between the features that correspond to the components of the article and the features associated with GD&T information.

As noted above, information can be extracted from scanned documents. In some examples, the scanned documents are stored in cartridges and/or film. In some examples, the extracted information and the relationships therein are stored in relational databases.

Figure 6:
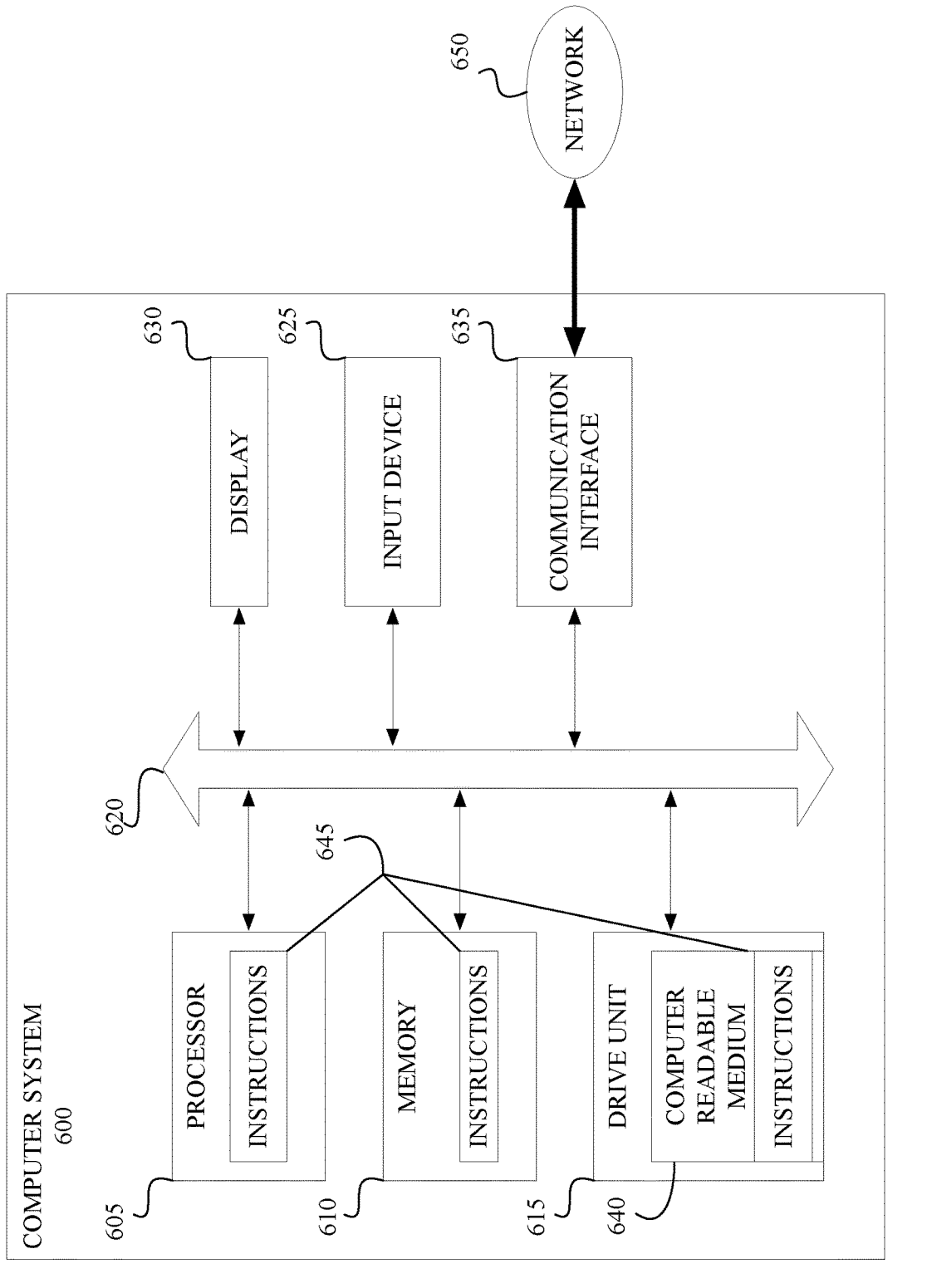
FIG. 6 illustrates a computer system that can form part of or implement any of the systems or devices of the environment, in accordance with example embodiments.

FIG. 6 illustrates an example of a computer system 600 that can form part of or implement any of the systems and/or devices described above. The computer system 600 can include a set of instructions 645 that the processor 605 can execute to cause the computer system 600 to perform any of the operations described above. An example of the computer system 600 can operate as a stand-alone device or can be connected, e.g., using a network, to other computer systems or peripheral devices.

In a networked example, the computer system 600 can operate in the capacity of a server or as a client computer in a server-client network environment, or as a peer computer system in a peer-to-peer (or distributed) environment. The computer system 600 can also be implemented as or incorporated into various devices, such as a personal computer or a mobile device, capable of executing instructions 645 (sequential or otherwise), causing a device to perform one or more actions. Further, each of the systems described can include a collection of subsystems that individually or jointly execute a set, or multiple sets, of instructions to perform one or more computer operations.

The computer system 600 can include one or more memory devices 610 communicatively coupled to a bus 620 for communicating information. In addition, code operable to cause the computer system to perform operations described above can be stored in the memory 610. The memory 610 can be random-access memory, read-only memory, programmable memory, hard disk drive, or any other type of memory or storage device.

The computer system 600 can include a display 630, such as a liquid crystal display (LCD), a cathode ray tube (CRT), or any other display suitable for conveying information. The display 630 can act as an interface for the user to see processing results produced by processor 605.

Additionally, the computer system 600 can include an input device 625, such as a keyboard or mouse or touchscreen, configured to allow a user to interact with components of system 600.

The computer system 600 can also include a disk or optical drive unit 615. The drive unit 615 can include a computer-readable medium 640 in which the instructions 645 can be stored. The instructions 645 can reside completely, or at least partially, within the memory 610 and/or within the processor 605 during execution by the computer system 600. The memory 610 and the processor 605 also can include computer-readable media, as discussed above.

The computer system 600 can include a communication interface 635 to support communications via a network 650. The network 650 can include wired networks, wireless networks, or combinations thereof. The communication interface 635 can enable communications via any number of wireless broadband communication standards, such as the Institute of Electrical and Electronics Engineering (IEEE) standards 802.11, 802.12, 802.16 (WiMAX), 802.20, cellular telephone standards, or other communication standards.

Accordingly, methods and systems described herein can be realized in hardware, software, or a combination of hardware and software. The methods and systems can be realized in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A computer-implemented method for extracting information from a diagram, the computer-implemented method comprising:

training first machine learning logic to identify different types of features associated with an article illustrated in the diagram by providing as input into the first machine learning logic, labeled training diagrams in which features of interest are identified by a bounding box and a label is associated with the bounding box;

identifying, via the first machine learning logic implemented by a computer, features associated with the article illustrated in the diagram;

creating a plurality of labeled knowledge graphs by converting information from the features identified via the first machine learning logic into nodes associated with the features and edges between the nodes that specify relationships between the features, wherein the features include structures of an aircraft and the relationships include characteristics of the structures of the aircraft;

training second machine learning logic to generate knowledge graphs by providing as input into the second machine learning logic the plurality of labeled knowledge graphs, wherein each knowledge graph specifies a different type of relationship between the features, wherein a node in each knowledge graph specifies a recurrent neural network (RNN) and a relationship between nodes in each knowledge graph specifies a feed-forward neural network (FFN) so that a relationship between a first node and a second is specified by connecting outputs of the RNN associated with the first node to inputs of the FFN and outputs of the FFN to inputs of the RNN associated with the second node;

generating, via the second machine learning logic implemented by the computer and based on the features, a knowledge graph that defines relationships between the features, wherein the knowledge graph specifies nodes associated with the features and edges between the nodes that specify the relationships between the features;

receiving, by the computer and from a user, a request for information associated with the diagram;

searching, by the computer, the knowledge graph for the information associated with the request; and communicating, by the computer, the information associated with the request to the user.

2. The computer-implemented method according to claim 1, wherein identifying the features associated with the article illustrated in the diagram comprises:

identifying, via the first machine learning logic, features associated with an article illustrated in a general arrangement drawing, wherein the general arrangement drawing specifies one or more views of the article and one or more physical dimensions associated with the article.

3. The computer-implemented method according to claim 1, wherein identifying the features associated with the article illustrated in the diagram comprises:

identifying, via one or more convolutional neural networks (CNNs), features associated with the article illustrated in the diagram, wherein the one or more CNNs include: a CNN trained to identify text information features, a CNN trained to identify geometric dimensioning and tolerancing (GD&T) information features, a CNN trained to identify one or more component features, and a CNN trained to identify view type features.

4. The computer-implemented method according to claim 3, further comprising:

identifying, by the CNN trained to identify text information features, one or more data table features in a general arrangement drawing.

5. The computer-implemented method according to claim 1, wherein identifying features associated with the article illustrated in the diagram comprises:

determining a feature type, a centroid of a feature, and the bounding box of the feature.

6. The computer-implemented method according to claim 1, wherein generating the knowledge graph that defines the relationships between the features comprises:

predicting, via a graph neural network and based on the features, the relationships between the features defined within the knowledge graph.

7. The computer-implemented method according to claim 1, wherein generating the plurality of labeled knowledge graphs comprises:

generating a first knowledge graph that specifies subcomponent relationships between features that correspond to components of the article;

generating a second knowledge graph that specifies connection relationships between the features that correspond to the components of the article and features associated with geometric dimensioning and tolerancing (GD&T) information; and generating a third knowledge graph that specifies location relationships between the features that correspond to the components of the article and the features associated with GD&T information.

8. A computing system:

one or more processors; and a memory in communication with the one or more processors, wherein the memory stores instruction code that, when executed by the one or more processors, causes the computing system to perform operations comprising:

training first machine learning logic to identify different types of features associated with an article illustrated in the diagram by providing as input into the first machine learning logic, labeled training diagrams in which features of interest are identified by a bounding box and a label is associated with the bounding box;

identifying, via the first machine learning logic implemented by the computing system, features associated with the article illustrated in the diagram;

creating a plurality of labeled knowledge graphs by converting information from the features identified via the first machine learning logic into nodes associated with the features and edges between the nodes that specify relationships between the features, wherein the features include structures of an aircraft and the relationships include characteristics of the structures of the aircraft;

training second machine learning logic to generate knowledge graphs by providing as input into the second machine learning logic the plurality of labeled knowledge graphs, wherein each knowledge graph, of the plurality of labeled knowledge graphs, specifies a different type of relationship between the features, wherein a node in each knowledge graph specifies a recurrent neural network (RNN) and a relationship between nodes in each knowledge graph specifies a feed-forward neural network (FFN) so that a relationship between a first node and a second node is specified by connecting outputs of the RNN associated with the first node to inputs of the FFN and outputs of the FFN to inputs of the RNN associated with the second node;

generating, via the second machine learning logic implemented by the computing system and based on the features, a knowledge graph that defines relationships between the features, wherein the knowledge graph specifies nodes associated with the features and edges between the nodes that specify the relationships between the features;

receiving, by the computing system and from a user, a request for information associated with the diagram;

searching, by the computing system, the knowledge graph for the information associated with the request; and communicating, by the computing system, the information associated with the request to the user.

9. The computing system according to claim 8, wherein identifying the features associated with the article illustrated in the diagram comprises:

identifying, via the first machine learning logic, features associated with an article illustrated in a general arrangement drawing, wherein the general arrangement drawing specifies one or more views of the article and one or more physical dimensions associated with the article.

10. The computing system according to claim 8, wherein identifying the features associated with the article illustrated in the diagram comprises:

identifying, via one or more convolutional neural networks (CNNs), features associated with the article illustrated in the diagram, wherein the one or more CNNs include: a CNN trained to identify text information features, a CNN trained to identify geometric dimensioning and tolerancing (GD&T) information features, a CNN trained to identify one or more component features, and a CNN trained to identify view type features.

11. The computing system according to claim 10, further comprising:

identifying, by the CNN trained to identify text information features, one or more data table features in a general arrangement drawing.

12. The computing system according to claim 8, wherein identifying features associated with the article illustrated in the diagram comprises:

determining a feature type, a centroid of a feature, and the bounding box of the feature.

13. The computing system according to claim 8, wherein generating the knowledge graph that defines the relationships between the features comprises:

predict, via a graph neural network and based on the features, the relationships between the features defined within the knowledge graph.

14. The computing system according to claim 8, wherein generating the plurality of labeled knowledge graphs comprises:

generating a first knowledge graph that specifies subcomponent relationships between features that correspond to components of the article;

generating a second knowledge graph that specifies connection relationships between the features that correspond to the components of the article and features associated with geometric dimensioning and tolerancing (GD&T) information; and generating a third knowledge graph that specifies location relationships between the features that correspond to the components of the article and the features associated with GD&T information.

15. A non-transitory computer-readable medium having stored thereon instruction code that, when executed by one or more processors of a computing system, causes the computing system to perform operations comprising:

training first machine learning logic to identify different types of features associated with an article illustrated in the diagram by providing as input into the first machine learning logic, labeled training diagrams in which features of interest are identified by a bounding box and a label is associated with the bounding box;

identifying, via the first machine learning logic implemented by the computing system, features associated with the article illustrated in the diagram;

creating a plurality of labeled knowledge graphs by converting information from the features identified via the first machine learning logic into nodes associated with the features and edges between the nodes that specify relationships between the features, wherein the features include structures of an aircraft and the relationships include characteristics of the structures of the aircraft;

training second machine learning logic to generate knowledge graphs by providing as input into the second machine learning logic the plurality of labeled knowledge graphs, wherein each knowledge graph, of the plurality of labeled knowledge graphs, specifies a different type of relationship between the features, wherein a node in each knowledge graph specifies a recurrent neural network (RNN) and a relationship between nodes in each knowledge graph specifies a feed-forward neural network (FFN) so that a relationship between a first node and a second node is specified by connecting outputs of the RNN associated with the first node to inputs of the FFN and outputs of the FFN to inputs of the RNN associated with the second node;

generating, via the second machine learning logic implemented by the computing system and based on the features, a knowledge graph that defines relationships between the features, wherein the knowledge graph specifies nodes associated with the features and edges between the nodes that specify the relationships between the features;

receiving, by the computing system and from a user, a request for information associated with the diagram;

searching, by the computing system, the knowledge graph for the information associated with the request; and communicating, by the computing system, the information associated with the request to the user.

16. The non-transitory computer-readable medium according to claim 15, wherein identifying the features associated with the article illustrated in the diagram comprises:

identifying, via the first machine learning logic, features associated with an article illustrated in a general arrangement drawing, wherein the general arrangement drawing specifies one or more views of the article and one or more physical dimensions associated with the article.

17. The non-transitory computer-readable medium according to claim 15, wherein identifying the features associated with the article illustrated in the diagram comprises:

identifying, via one or more convolutional neural networks (CNNs), features associated with the article illustrated in the diagram, wherein the one or more CNNs include: a CNN trained to identify text information features, a CNN trained to identify geometric dimensioning and tolerancing (GD&T) information features, a CNN trained to identify one or more component features, and a CNN trained to identify view type features.

18. The non-transitory computer-readable medium according to claim 17, further comprising:

identifying, by the CNN trained to identify text information features, one or more data table features in a general arrangement drawing.

19. The non-transitory computer-readable medium according to claim 15, wherein identifying features associated with the article illustrated in the diagram comprises:

determining a feature type, a centroid of a feature, and the bounding box of the feature.

20. The non-transitory computer-readable medium according to claim 15, wherein generating the knowledge graph that defines the relationships between the features comprises:

predicting, via a graph neural network and based on the features, the relationships between the features defined within the knowledge graph.

* * * * *